Nov. 26, 1968  M. E. HODGES  3,413,538
CONTROL MEANS FOR STARTING ELECTRIC POWER CONVERTERS
AT REDUCED OPERATING FREQUENCIES
Filed April 15, 1965  2 Sheets-Sheet 2
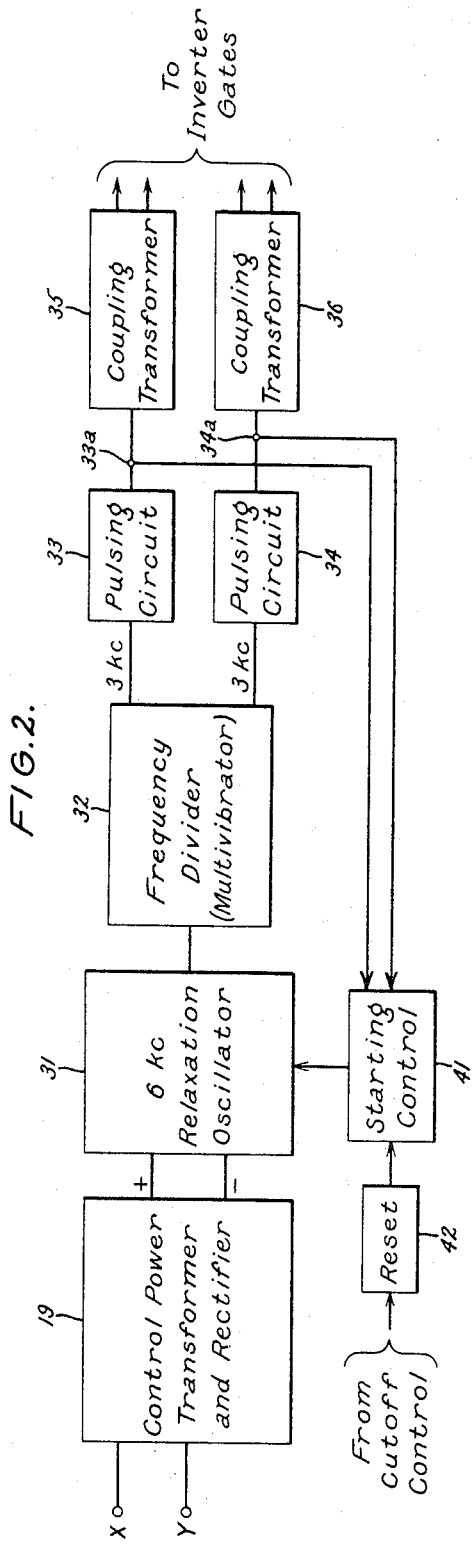
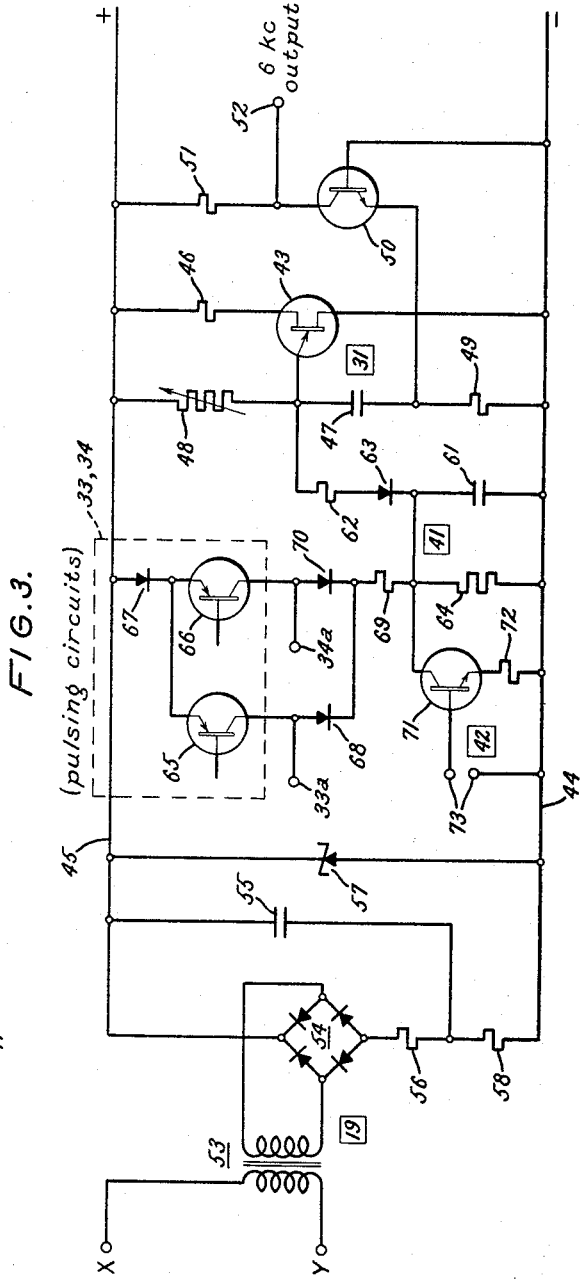
INVENTOR:
MERWYN E. HODGES,
BY Albert S. Richardson Jr.
ATTORNEY 3,413,538
CONTROL MEANS FOR STARTING ELECTRIC
POWER CONVERTERS AT REDUCED OPER-
ATING FREQUENCIES
Merwyn E. Hodges, Broomall, Pa., assignor to General
Electric Company, a corporation of New York
Filed Apr. 15, 1965, Ser. No. 448,399
7 Claims. (Cl. 321—2)

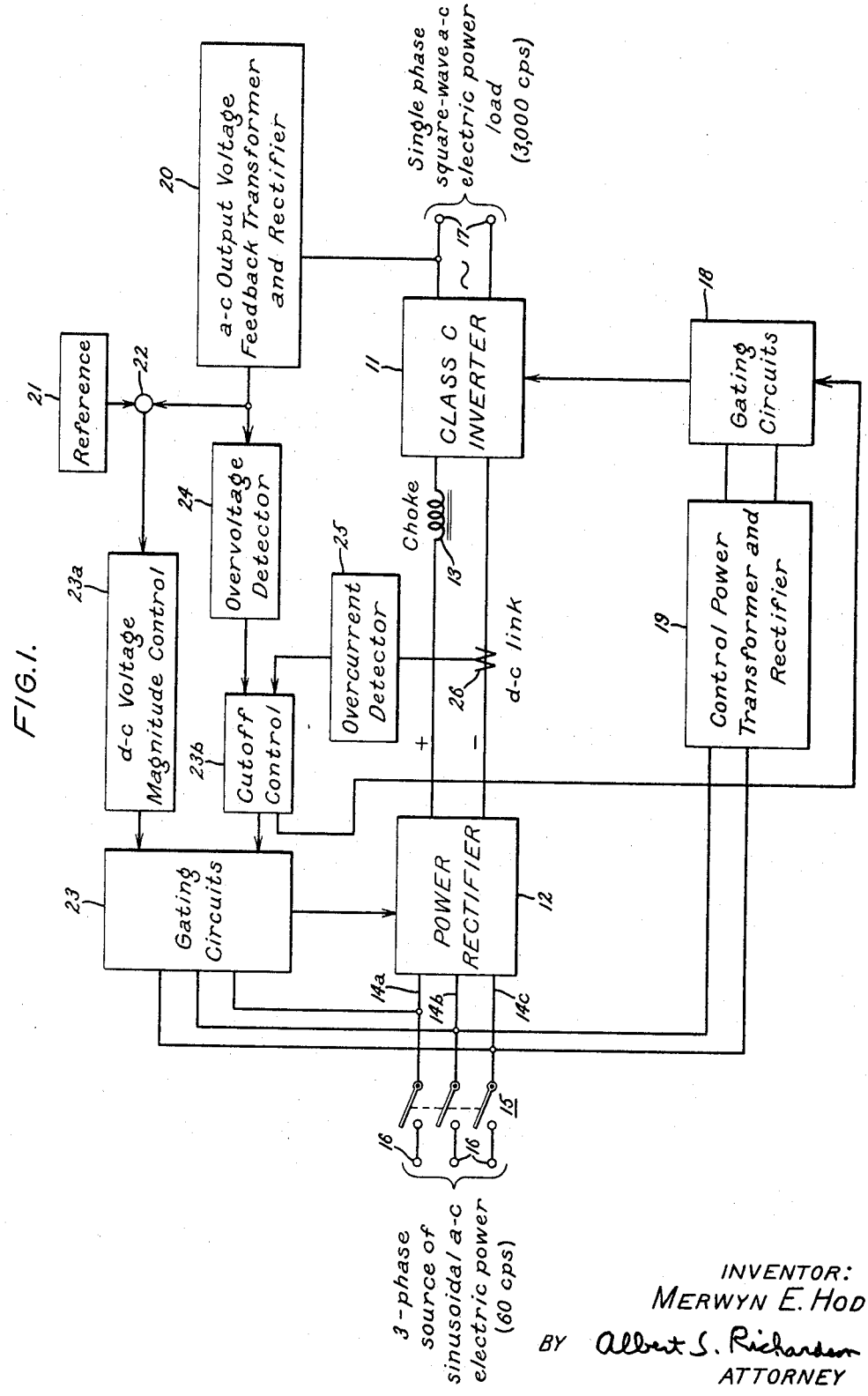

ABSTRACT OF THE DISCLOSURE

To ensure successful start-up of a capacitor-commutated controlled-rectifier inverter having D-C supply terminals connected to a substantially constant-current source, the control circuitry that determines operating frequency of the inverter is arranged to effect a subnormal frequency when the D-C supply terminals are originally energized.

---

This invention relates to control means for an inverter that is used to convert electric power from direct to alternating form, and more particularly it relates to means for controlling a high-frequency capacitor-commutated inverter supplied from an essentially constant-current source of D-C power so that proper starting operation of the inverter is obtained when the source is first energized.

My invention is particularly useful in conjunction with inverters of the kind wherein conversion of D-C to A-C power is accomplished by controlling the conduction of a plurality of electric valves known as controlled rectifiers or thyristors. A controlled rectifier is a unidirectionally conducting device having an anode, a cathode, and a gate electrode. With forward voltage across its anode-to-cathode terminals (i.e., with the anode at a positive potential with respect to the cathode), it can be switched from a high-impedance blocking state to a low-forward-impedance conducting state by applying an electric signal of appropriate polarity, magnitude, and duration between the gate and cathode terminals. The signal that initiates this "triggering" or turn-on action will be referred to hereinafter as a gate pulse.

When a controlled rectifier has switched to its on condition, the gate loses control and forward anode current will continue until subsequently extinguished by the action of external circuit components. Conduction can be stopped by reducing anode current below a minimum magnitude known as the holding current, or by diverting it from the rectifier by connecting thereacross a suitable source of reverse anode-to-cathode voltage. In either case, successful switching of the controlled rectifier to its "off" condition requires that reapplication of forward voltage be delayed after forward current reaches zero until the device has had time to regain completely its forward-blocking capability. The interval of time required for this purpose is generally known as the "turn-off time" of a controlled rectifier, and to ensure reliable commutation the inverter "margin angle" has to be at least as long.

In the art of electric power inverters "commutation" is the name given the definite transfer of load current from one controlled rectifier (the "outgoing" rectifier) to the next-conducting controlled rectifier (the "incoming" rectifier). The interval of time beginning at the moment that forward current in the outgoing rectifier is reduced to zero and ending when the anode-to-cathode terminals of this rectifier are next subjected to forward voltage is herein referred to as the commutation margin angle of the inverter. This is the time "$t_c$" actually available for turning off the outgoing controlled rectifier, and it equals the turn-off time of the rectifier plus any ensuing period of reverse voltage across the turned off device. If the margin angle were not sufficient to allow the outgoing rectifier to recover its ability to block forward voltage, commutation would fail.

In order to obtain the desired commutation, capacitive reactance may be introduced in circuit with the A-C output (load) terminals of the inverter. "Capacitor-commutated" inverters are well known in the art. The capacitance may be either in parallel or in series circuit relationship with the load, or commutation may be accomplished by a combination of parallel and series capacitor-commutated techniques. In all cases, assuming steady-state operation, the capacitor is charged during the conducting period of one controlled rectifier and will ultimately attain, before the incoming rectifier is turned on, a charge of requisite polarity and amount to aid or to force complete commutation. Capacitor charging current is derived from the source of power to which the D-C input (supply) terminals of the inverter are connected. The value of the above-mentioned margin angle depends on the magnitude of this current, the operating frequency of the inverter, and the size of the commutating reactance.

When operating a capacitor-commutated inverter at high frequency (e.g. 3,000 cycles per second) in conjunction with a constant direct current source, reliable starting is a problem. By constant-current source I mean a series combination (or equivalent) of a source of unipolarity supply voltage and a high-impedance circuit element such as a large reactor or choke coil. The D-C supply voltage can be derived from an A-C electric power source by appropriate rectifying means. The choke will prevent cyclic variations in the direct current input to the inverter.

When the constant-current source is first energized (or more specifically, when the D-C supply voltage is applied to a previously deenergized choke) and inverter operation is begun, the input current to the inverter will increase from zero at a relatively gradual rate. During this initial transient condition the commutating capacitor requires more time to accumulate the requisite charge than during subsequent steady-state conditions, and there is a real risk of commutation failure. Accordingly, it is a general object of my invention to ensure reliable commutation in the inverter when starting.

Another object of the present invention is to provide control means for obtaining proper starting operation of a capacitor-commutated inverter in response to its constant-current source being energized.

In carrying out my invention in one form, the power-supply terminals of a high-frequency capacitor-commutated inverter are adapted to be connected to a constant-current source of D-C power. Controlled rectifiers are used as the main switching elements of this inverter, and gating circuits are provided to produce appropriate gate pulses for turning on these rectifiers at a predetermined frequency (e.g. 3,000 times per second) in a predetermined sequence. The gate pulses are derived from a suitable control power source to which the gating circuits are connected. To ensure successful starting of the inverter, I provide control means for effecting the operation of the gating circuits in response to original energization of the constant-current source and the control power source. (The term "original" energization as used herein is meant to designate the act of energizing, at any time, a component that previously had been in a deenergized state.)

In one aspect of the invention, the aforesaid control means is arranged to cause operation of the gating circuits at an initially reduced frequency whenever the inverter supply terminals are first energized or later reenergized by the constant-current source, whereby extra time is allowed for charging the commutating capacitor under starting conditions when the inverter input current is relatively low. As a result, the margin angle of the inverter will be adequate to ensure reliable commutation during inverter starting or restarting.

My invention will be better understood and its various objects and advantages will be more fully appreciated from the following description taken in conjunction with the accompanying drawings in which:

FIG. 1 is a schematic block diagram of an electric power converter embodying my invention;

FIG. 2 is a functional diagram of the inverter gating circuits shown in block form in FIG. 1; and FIG. 3 is a schematic circuit diagram of the control power source, the master oscillator, and the starting control means shown in block form in FIG. 2.

For the purpose of illustrating a practical embodiment of my invention, I have shown in block form in FIG. 1 a complete high-frequency electric power supply system comprising a capacitor-commutated inverter 11 (labeled "Class C Inverter") connected for energization to a constant-current source of D-C power. Preferably the D-C power source comprises a source of variable magnitude unipolarity supply voltage 12 (labeled "Power Rectifier") in series with a choke coil 13. The power rectifier 12 is connected via input voltage leads 14a, 14b, and 14c and a 3-pole starting switch 15 (shown open in FIG. 1) to a set of terminals 16 adapted to be energized by a 3-phase source of sinusoidal alternating voltage of commercial power frequency (e.g. 60 c.p.s.). The choke 13 is shown in the positive conductor of the D-C link that interconnects the power rectifier 12 and the inverter 11, but alternatively it may be connected in the negative conductor.

The inverter 11 can be of any suitable design using conventional controlled rectifiers and known capacitor-commutating techniques. See for example chapters 4 and 5, pages 89–148 of Principles of Inverter Circuits by B. D. Bedford and R. G. Hoft (John Wiley and Sons, N.Y., 1964). This inverter operates when energized by its constant-current source to supply single-phase square-wave A-C electric power of relatively high frequency to a load circuit (not shown) connected across a pair of inverter output terminals 17. In order to turn on the controlled rectifiers of the inverter in the proper sequence and at the desired frequency (e.g. 3,000 c.p.s.), a train of gate pulses is applied to the inverter 11 by gating circuits 18. The necessary power for the gate pulses is provided by a suitable D-C control power source such as the control power transformer and rectifier component 19 shown connected in FIG. 1 to the A-C input voltage leads 14b and 14c and to the negative conductor of the D-C link. Further details of the gating circuits 18 and of the control power component 19 have been illustrated in FIGS. 2 and 3 and will soon be described.

The complete power supply system that is shown in FIG. 1 includes means for regulating the A-C ouput voltage of the inverter 11. Toward this end, voltage transforming and rectifying means 20 has been coupled to the load terminals 17 to provide a representative feedback signal that is compared with a given reference signal from block 21 in a conventional comparison circuit 22. In the illustrated system the difference or error signal from the comparison circuit 22 is used to supervise a D-C voltage magnitude control component 23a of gating circuits 23 associated with the power rectifier 12.

The gating circuits 23 can be of any suitable design for producing, in synchronism with the A-C input voltage, a succession of gate pulses that turn on "phase-controlled" rectifiers in the respective legs of the polyphase power rectifier 12. Typical circuits of this kind are disclosed in chapter 8, pages 125–52 of the Silicon Controlled Rectifier (SCR) Manual published by the General Electric Company (Auburn, N.Y.) 3d edition, 1964. By varying the trigger delay angle of these gate pulses, as measured from a gate pulse incidence that would enable the rectifier 12 to produce maximum D-C voltage, the average magnitude of the resulting voltage applied across the D-C link of the system can be varied. This mode of voltage control is commonly known as phase retard. The amount of phase retard is determined by the magnitude of the error signal activating the control component 23a, and consequently the power rectifier 12 will tend to supply the inverter 11 with D-C voltage of appropriate magnitude to maintain the high-frequency inverter output at substantially constant voltage regardless of load changes or A-C input voltage changes.

The illustrated system also includes means for de-energizing the D-C link in high-speed response to the occurrence of overvoltage or overcurrent conditions. Perferably this protection is afforded by a cutoff control component 23b of the power rectifier gating circuits 23, which component is arranged to develop a signal that turns off these gating circuits, thereby discontinuing the gate pulses and causing zero D-C supply voltage, whenever signalled to do so by operation of either an overvoltage detector 24 or an overcurrent detector 25. The overvoltage detector 24 is shown connected to the transforming and rectifying means 20, and it operatively responds to the A-C output voltage of the inverter exceeding a predetermined critical value. The overcurrent detector 25 is connected by suitable D-C current sensing means 26 to the negative (or alternatively, the positive) conductor of the D-C link, and it operatively responds when a predetermined abnormal current condition occurs in the inverter 11.

The cutoff control component 23b is preferably arranged to disable the power rectifier gating circuits 23 only momentarily, whereby D-C supply voltage is quickly restored after an overcurrent disturbance. If the abnormal condition remains uncorrected and more permanent protection is desired, the starting switch 15 can be opened. For reasons that are explained hereinafter, an interconnection is provided between the cutoff control 23b and the inverter gating circuits 18.

The above-mentioned inverter gating circuits 18 have been shown in more detail in FIG. 2. The gating circuits are there seen to comprise a master oscillator 31 connected to a frequency divider or flip-flop 32 which controls two alternatively operative pulsing circuits 33 and 34 of conventional design. An output terminal 33a of the pulsing circuit 33 is connected to a coupling transformer 35 arranged to supply gate pulses to the gate or gates of a set of one or more simultaneously switched controlled rectifiers in the inverter 11 of FIG. 1, and an output terminal 34a of the pulsing circuit 34 is connected to another coupling transformer 36 arranged to supply gate pulses to the gate or gates of a different set of one or more controlled rectifiers in the inverter.

The pulsing circuit 33 will operate at one-half the frequency of the oscillator 31 to produce at terminal 33a a first train of pulsating electric signals which are converted to gate pulses by the coupling transformer 35. The pulsing circuit 34 operates similarly, but midway between the operating periods of the companion circuit 33, to produce at terminal 34a a second train of intermittent electric signals which are converted to gate pulses by the coupling transformer 36. The power needed to operate the oscillator 31 and the frequency divider 32 and to generate the aforesaid signal trains is taken from the control power transformer and rectifier component 19 whose source terminals X and Y may be connected, respectively, to the A-C input voltage leads 14b and 14c of FIG. 1.

The master oscillator 31 shown in FIG. 2 is a periodically operative relaxation oscillator having a natural operating frequency of 6,000 c.p.s. Its normal operation is affected, however, by my starting control means which in FIG. 2 is functionally represented by the block 41. Whenever control power is applied to a previously quiescent oscillator 31, the control means 41 will momentarily delay the first oscillation. It will also reduce the operating frequency of the oscillator for a predetermined starting interval, the duration of which can be controlled by means of the feedback connections shown between the block 41 and the respective terminals 33a and 34a of the pulsing circuits. In order to enable the starting control means 41 to perform this function whenever the D-C power source of the inverter 11 is reenergized after being momentarily deenergized by operation of the protective means 25 (FIG. 1), I provide means 42 for resetting the control means 41 in response to such operation.

Circuitry shown in detail in FIG. 3 can be used to accomplish the above-described functions of my starting control means. In this figure the master oscillator 31 of the inverter gating circuits is shown as a unijunction transistor relaxation oscillator of well known design. See U.S. Patent 3,026,485, Suran, granted on Mar. 20, 1962. The two base electrodes of a unijunction transistor 43 are connected to a pair of D-C control power conductors or buses 44 and 45 of relatively negative and positive potentials, respectively, with a resistor 46 in series with base-two, and the emitter of the unijunction transistor is connected to the junction of a capacitor 47 and a variable resistor 48 which form a series RC circuit across the same buses. A relatively small resistor 49 is connected between the negative control power bus 44 and the capacitor 47, and the base-emitter circuit of a normally inactive NPN transistor 50 is connected in shunt therewith. The collector of the latter transistor is connected by way of a load resistor 51 to the positive control power bus 45. An output terminal 52, where the output signals of the oscillator 31 will appear, is connected to the collector of the transistor 50.

Under steady-state operating conditions, the capacitor 47 periodically charges, at a rate determined by the time constant of its charging circuit, to a characteristic emitter peak-point voltage that triggers the unijunction transistor 43, whereupon the capacitor is abruptly discharged through a then low-impedance path including the emitter-base-one junction of that transistor and the base-emitter junction of the transistor 50. Thus the transistor 50 is recurrently turned on, and a succession of discrete signal pulses is produced at the output terminal 52 for activating the succeeding frequency divider (component 32 in FIG. 2) in synchronism therewith. The operating frequency of the oscillator 31 depends on the time constant of the series RC circuit, and the desired frequency (e.g. 6,000 c.p.s.) can be precisely obtained by selecting appropriate parameters and finely adjusting the resistor 48.

Control power for the oscillator 31 is supplied by the control power transformer and rectifier component 19 which in FIG. 3 is seen to comprise a potential transformer 53 and a full-wave bridge rectifier 54. The input winding of the transformer 53 is connected between the A-C source terminals X and Y, while opposite ends of its output winding are connected to the A-C terminals of the rectifier 54. A smoothing capacitor 55, in series with a resistor 56, is connected between the positive and the negative D-C terminals of the rectifier 54, and the series combination of a regulator or reference diode 57 and a dropping resistor 58 is connected across the capacitor 55. The relatively positive terminal of the regulator diode 57 is connected to the control power bus 45, and the negative terminal of this element is connected to the control power bus 44. The buses 44 and 45 extend not only to the oscillator 31 but also to the associated circuit components 32, 33, and 34, and the gate pulses produced by the coupling transformers 35 and 36 (FIG. 2) are derived from this source.

The diode 57 serves as a voltage regulator to maintain a substantially constant potential difference of predetermined magnitude (e.g. 24 volts) between the control power buses 44 and 45. However, when the A-C source terminals X and Y are originally energized, this voltage magnitude is not immediately attained across these buses but is instead approached at a finite rate as the smoothing capacitor 55 accumulates charge. Since the emitter peak-point voltage of a unijunction transistor varies in proportion to its interbase voltage, the oscillator 31 is capable of operating prematurely, before the value of control pow-er is adequate to assure gate pulses of sufficient magnitude and duration to reliably effect triggering of the controlled rectifiers of the inverter 11. This improper gating circuit operation has been prevented by providing starting control means 41 for momentarily delaying the first triggering of the unijunction transistor 43 under the transient circumstances just referred to.

In the preferred embodiment of my invention, the first operation of the oscillator 31 is delayed by connecting in parallel circuit relationship with the capacitor 47 an additional capacitor 61 of much higher capacitance. As indicated in FIG. 3, the large capacitor 61, in series with a resistor 62 and an isolating diode 63 that is poled for passing charging current and blocking discharge current, is connected between the negative control power bus 44 and the positive terminal of the capacitor 47, and a resistor 64 of relatively high resistance is connected across the capacitor 61. The additional capacitor 61 is therefore effective, when the state of the control power buses 44 and 45 is changed from deenergized to energized, to delay the rise of emitter voltage so that a relatively long initial interval of time (e.g. 0.07 second, which is about 400 times longer than the natural period of the oscillator 31) will thereafter elapse before this voltage reaches a peak-point magnitude that triggers the unijunction transistor 43. By the end of this prolonged initial time interval, the increasing control power potential across the buses 44 and 45 has become appreciable and operation of the inverter gating circuits 18 can safely proceed. This feature has the further benefit of giving the gating circuits 23 of the power rectifier 12 ample time to achieve a transient-free operative state before beginning inverter operation when the starting switch 15 is originally closed or later reclosed.

The blocking diode 63 prevents discharge of the large capacitor 61 when the unijunction transistor 43 is triggered. This diode will then remain reversely biased until the capacitor 47 next charges, at its normal rate, to a voltage that is equal in magnitude to the voltage across the capacitor 61, at which point the latter capacitor again introduces some extra delay in the subsequent rise of emitter voltage to its peak-point. The capacitor 61 is therefore effective, during a predetermined starting interval, to cause the oscillator 31 to operate at reduced frequency. Its effectiveness diminishes each cycle, and soon the cumulative voltage across the capacitor 61 will exceed a level so near the peak-point magnitude that the effect of the control means 41 on the inverter gating circuit operation becomes negligible.

The initial reduction of oscillator frequency ensures reliable commutation in the capacitor-commutated inverter 11 while starting. This beneficial feature of my invention can best be understood by considering what happens in the inverter under starting or restarting conditions. Assume that the starting switch 15 of FIG. 1 is operated from its open position to its closed position. Until the gating circuits 18 begin producing gate pulses for the controlled rectifiers of the inverter 11, the inverter has zero input current and its commutating capacitor is in a discharged state. As soon as the first gate pulse is produced in response to the first operation of oscillator 31, a controlled rectifier is triggered and will start conducting input current, some or all of which serves as charging current for the commutating capacitor. This charging current, which cannot increase abruptly because of the impedance of the large choke 12 in the D-C link of the power supply system, will have a relatively low magnitude for an appreciable starting interval.

The second operation of the oscillator 31 should not occur until a long enough period of time has elapsed after the initial oscillator operation to ensure that the commutating capacitor has accumulated the requisite charge for facilitating complete commutation when it does occur. Because of the relatively low charging current, the critical length of this first period of conduction is likely to be longer than the normal operating period of the high frequency oscillator 31, and hence the control means 41 has been used to reduce initial oscillator frequency. Except for such means, the commutation margin angle of the inverter (as defined in the introductory portion of this specification) might initially be shorter than the controlled rectifier turn off time, and commutation would fail.

On the valid assumption that inverter input current is initially rising at a linear rate, an ample margin angle can be ensured if the period between the second and third operations of the oscillator 31 is about one-half that of the preceding period and if the period between the third and fourth operations of the oscillator is at least one-third that of the first period. By the time a steady-state operating condition of oscillator 31 is reached, the attained magnitude of inverter input current will have substantially exceeded the level required to provide adequate margin angle in the normal interval between pulses, for varying amounts of connected load.

In one successfully operated commercial embodiment of my invention, the starting control means 41 was arranged to cause the second operation of the master oscillator 31 approximately .00033 second after the initial operation. This period, corresponding to a frequency of 3,000 c.p.s., was sufficient to ensure complete commutation when starting the inverter 11 under either loaded or unloaded conditions. At the conclusion of this first period the control means 41 was disabled, and thereafter the oscillator assumed a natural operating frequency (6,000 c.p.s.) which provided second and successive periods equal to 50 percent of the first.

Within limits determined by the need to obtain reliable commutation, the normal operating frequency of the inverter should be reached as soon as possible during the starting process to avoid a serious over-voltage condition that might result from excessive charging of the commutating capacitor during the first twenty or thirty cycles of inverter operation which elapse before the voltage regulating means of the system can be counted on to effect corrective action.

To positively disable the starting control means 41 at the conclusion of the desired interval of reduced frequency, I supervise its operation by means of feedback connections to the pulsing circuits 33 and 34. As is shown in FIG. 3, the pulsing circuits 33 and 34 of the inverter gating circuits 18 include normally inactive (turned off) transistors 65 and 66, respectively. The emitters of these PNP transistors are connected in common through a diode 67 to the positive control power bus 45, and their collectors are connected, respectively, to the terminals 33a and 34a where positive-going electric signals are generated each time the associated transistor is turned on. For the sake of drawing simplicity I have omitted in FIG. 3 the circuit means for alternately supplying the base electrodes of the transistors 65 and 66 with pulsating forward-bias signals in response to successive output signals produced at the terminal 52 by operation of the master oscillator 31.

As can be seen in FIG. 3, a feedback connection from the pulsing circuit output terminal 33a is made through an isolating diode 68 and a current limiting resistor 69 to the positive terminal of the capacitor 61 of the starting control means 41. Another feedback connection is made from the pulsing circuit output terminal 34a through an isolating diode 70 and the current limiting resistor 69 to the same terminal of the capacitor 61. Each time the master oscillator 31 operates, a pulse of charging current for the capacitor 61 will be provided from the control power bus 45 through whichever one of these feedback connections is then activated. This augments any charge previously accumulated by the capacitor 61 during charging of the oscillator capacitor 47, and ultimately it enables the cumulative voltage across capacitor 61 to continuously exceed the level of the emitter peak-point voltage of the unijunction transistor 43, the isolating diode 63 being consequently back biased.

By an appropriate selection of parameters, the above described circuitry can be arranged to superimpose enough charge on the capacitor 61 to disable the control means 41 by back biasing the isolating diode 63 after a predetermined number of operating cycles of the oscillator 31. For example, this result can be accomplished in response to the occurrence of two operations of the oscillator, as it was in the commercial embodiment referred to above.

As noted hereinbefore, reset means 42 is provided for resetting the starting control means 41 if the inverter's D-C power source is deenergized without opening the starting switch 15. In the embodiment of my invention shown in FIG. 3, this resetting operation is accomplished by means of a normally inactive NPN transistor 71 connected across the capacitor 61. The collector of this transistor is connected to the positive capacitor terminal, and the emitter is connected through a current limiting resistor 72 to the negative control power bus 44. Its base-emitter junction is connected between a pair of terminals 73 that are adapted to receive a forward-bias signal concurrently with the development of a turn-off signal in the cutoff control component 23b of the power rectifier gating circuits 23 (FIG. 1). Thus when the power rectifier 12 is turned off by operation of the protective means 24 or 25, the transistor 71 is turned on to provide a low-impedance path for quickly discharging the capacitor 61 which is thereby maintained discharged (reset) so long as the transistor remains on. At this time operation of the master oscillator 31 is also prevented by diverting the charging current for capacitor 47 through the now forward biased isolating diode 63 and the resistor 62.

As soon as the power rectifier gating circuits 23 are returned to normal, the D-C supply voltage for the inverter 11 is restored and the transistor 71 will simultaneously return to its normally inactive or turned off state. Now the capacitor 61 of the control means 41 is fully effective to cause operation of the oscillator 31 at reduced frequency for a predetermined interval of time, and reliable commutation in the inverter 11 while restarting is ensured as before. Note, however, that the delay in the first operation of the oscillator 31 following this resetting action will be significantly shorter than before, because the control power buses 44 and 45 have remained in their fully energized state. For the same reason there is now no need for the prolonged initial time interval.

While I have shown and described a preferred form of my invention by way of illustration, many modifications will occur to those skilled in the art. I therefore contemplate by the claims that conclude this specification to cover all such modifications as fall within the true spirit and scope of the invention.

What I claim as new and desire to secure by Letters Patent of the United States is:

1. Means for controlling the operation of a capacitor-commutated inverter whose main switching elements are controlled rectifiers, the inverter being adapted to be energized by a substantially constant-current source of D-C power, comprising:
   (a) periodically operative means for generating a succession of discrete electric signals at a predetermined frequency;
   (b) means connected to said periodically operative means and activated by said signals for supplying the controlled rectifiers of the inverter with gate pulses that will turn on the rectifiers in predetermined sequence at a frequency dependent on the operating frequency of said periodically operative means; and
   (c) starting control means connected to said periodically operative means for effecting the operation thereof, said starting control means being responsive to original energization of the inverter for reducing the operating frequency of the periodically operative means during a predetermined starting interval.

2. The inverter control means of claim 1 in which the starting control means is disabled and the starting interval is concluded in response to the occurrence of a predetermined number of reduced-frequency operations of the periodically operative means.

3. The inverter control means of claim 1 in which said periodically operative means includes a resistor and a first capacitor interconnected to form a series RC circuit that is adapted to be energized by D-C control power when the inverter is energized by said source of D-C power, and in which said starting control means comprises an additional capacitor connected in series with a blocking diode across said first capacitor, said blocking diode enabling said additional capacitor simultaneously to charge but not to discharge with said first capacitor.

4. Means for controlling the operation of a capacitor-commutated inverter whose main switching elements are controlled rectifiers, the inverter being adapted to be energized by a substantially constant-current source of D-C power, comprising:
 (a) an oscillator operative to produce a succession of discrete electric signals at a predetermined normal frequency;
 (b) means connected to said oscillator and activated by said signals for suppying the controlled rectifiers of the inverter with gate pulses that will turn on the rectifiers in predetermined sequence at a frequency dependent on the operating frequency of said oscillator;
 (c) starting control means for effecting a reduction in the operating frequency of the oscillator during a predetermined starting interval following original energization of the inverter, said starting means being arranged to enable said frequency to increase after each oscillator operation during said interval until said predetermined normal frequency is assumed at its conclusion; and
 (d) means for interconnecting said starting control means and said oscillator.

5. In combination:
 (a) a capacitor-commutated inverter whose main switching elements are controlled rectifiers, the inverter having D-C supply terminals and A-C load terminals;
 (b) a source of unipolarity supply voltage;
 (c) means including a high-impedance series circuit element interconnecting said source and said supply terminals;
 (d) periodically operative means for generating a succession of discrete electric signals at a predetermined normal frequency;
 (e) means connected between said inverter and said periodically operative means and activated by said signals for supplying the controlled rectifiers of the inverter with gate pulses that will turn on the rectifiers in predetermined sequence at a frequency dependent on the operating frequency of said periodically operative means;
 (f) starting control means responsive to supply voltage being initially applied to said interconnecting means for effecting operation of said periodically operative means at a frequency lower than said normal frequency for a predetermined starting interval; and
 (g) means for connecting said starting control means to said periodically operative means.

6. Means for controlling the operation of a capacitor-commutated inverter whose main switching elements are controlled retcifiers, the inverter having D-C supply terminals adapted to be energized by a substantially constant-current source of D-C power, comprising:
 (a) a pair of control power conductors adapted to be energized by a source of D-C control power;
 (b) periodically operative means connected to said conductors and responsive to the presence of said control power for generating a succession of discrete electric signals at a predetermined natural frequency;
 (c) inverter gating means, connected to said control power conductors and to said periodically operative means, for deriving gate pulses from the control power in response to activation by said signals and for supplying said gate pulses to the controlled rectifiers of the inverter; and
 (d) starting control means connected to said periodically operative means, said starting control means being
  (i) effective in response to original energization of the control power conductors to delay the first operation by said periodically operative means for appreciably longer than the natural period of the latter means and
  (ii) thereafter operative to reduce the initial operating frequency of the periodically operative means for a predetermined starting interval.

7. The inverter control means of claim 6 in which additional means is provided for resetting the starting control means in response to the inverter supply terminals being deenergized while the control power conductors remain energized, whereby said starting control means is able to operate again in response to reenergization of the inverter supply terminals.

References Cited

UNITED STATES PATENTS

| | | | |
|---|---|---|---|
| 3,329,907 | 7/1967 | Helgeson et al. | 331—111 |
| 2,596,606 | 5/1952 | Scherer | 321—32 |
| 3,133,241 | 5/1964 | White | 321—45 |
| 3,172,060 | 3/1965 | Jensen | 331—113 |
| 3,246,227 | 4/1966 | Strohmeier et al. | 331—111 |
| 3,260,962 | 7/1966 | Draper | 331—111 |
| 3,264,548 | 8/1966 | King | 321—45 |
| 3,315,146 | 4/1967 | Paice | 321—18 |

LEE T. HIX, *Primary Examiner.*

WILLIAM M. SHOOP, JR., *Assistant Examiner.*